(12) United States Patent
Cassidy

(10) Patent No.: US 12,288,481 B2
(45) Date of Patent: Apr. 29, 2025

(54) SYSTEMS AND METHODS FOR PROVIDING AN INTERACTIVE ASYNCHRONOUS VIDEO LEARNING PLATFORM

(71) Applicant: Ellen Cassidy, Dallas, TX (US)

(72) Inventor: Ellen Cassidy, Dallas, TX (US)

( * ) Notice: Subject to any disclaimer, the term of this patent is extended or adjusted under 35 U.S.C. 154(b) by 0 days.

(21) Appl. No.: 18/207,782

(22) Filed: Jun. 9, 2023

(65) Prior Publication Data
US 2023/0410672 A1    Dec. 21, 2023

Related U.S. Application Data

(60) Provisional application No. 63/350,479, filed on Jun. 9, 2022.

(51) Int. Cl.
   G09B 5/00   (2006.01)
   G09B 5/06   (2006.01)
   H04L 9/40   (2022.01)

(52) U.S. Cl.
   CPC .............. G09B 5/065 (2013.01); H04L 63/10 (2013.01)

(58) Field of Classification Search
   CPC ............ G09B 5/065; G09B 7/02; H04L 63/10
   See application file for complete search history.

(56) References Cited

U.S. PATENT DOCUMENTS

| | | | | |
|---|---|---|---|---|
| 7,733,366 B2 * | 6/2010 | Beavers | ............. | H04L 12/1813 709/204 |
| 10,360,618 B1 * | 7/2019 | Hantman | ............... | G09B 5/065 |
| 2003/0194690 A1 * | 10/2003 | Wessner | ................... | G09B 7/00 434/350 |
| 2014/0057239 A1 * | 2/2014 | Vehovsky | ............... | G09B 5/06 434/322 |
| 2014/0272887 A1 * | 9/2014 | Van Tuyl | ................ | G09B 7/02 434/350 |
| 2014/0272893 A1 * | 9/2014 | Rozycki | .................. | G09B 7/02 434/350 |
| 2016/0307459 A1 | 10/2016 | Chestnut et al. | | |
| 2018/0032524 A1 * | 2/2018 | Byron | ...................... | G09B 7/02 |
| 2020/0287984 A1 | 9/2020 | Walsh et al. | | |
| 2022/0121884 A1 | 4/2022 | Zadeh et al. | | |

OTHER PUBLICATIONS

International Search Report and Written Opinion of the International Searching Authority issued in International Application No. PCT/US2023/068164, 17 pages, dated Oct. 3, 2023.

\* cited by examiner

*Primary Examiner* — Peter R Egloff
(74) *Attorney, Agent, or Firm* — DUBOIS, BRYANT & CAMPBELL, LLP; William D. Wiese

(57) ABSTRACT

A system for providing an interactive asynchronous video learning platform is disclosed, including at least one user computing device in operable connection with a network. A server is in operable communication with the user network to host an interactive asynchronous video learning platform for providing interactive asynchronous video learning. The application program includes a user interface module for providing access to the interactive asynchronous video learning platform through the at least one user computing device. A learning module provides at least one prompt and at least one learner skill demonstration. A self-check module provides a guided review of a learner's previously submitted learner skill demonstrations.

14 Claims, 9 Drawing Sheets

SYSTEMS AND METHODS FOR PROVIDING AN INTERACTIVE ASYNCHRONOUS VIDEO LEARNING PLATFORM

CROSS-REFERENCE TO RELATED APPLICATION

This Application claims the benefit of U.S. Provisional Application Ser. No. U.S. 63/350,479, filed Jun. 9, 2022, which is incorporated herein by reference in its entirety.

TECHNICAL FIELD

The present disclosure is generally related to the fields of asynchronous education and secured cloud computing.

BACKGROUND

Learning new skills is an endeavor many continue throughout life. Historically, students of any age have attended in-person learning wherein a teacher delivers a lesson using various teaching techniques. In recent years, online learning has become more prevalent. Some known online learning services provide videos, assignments, and corresponding tests/quizzes which mimic a traditional classroom environment. Some systems offer virtual tailored learning with an instructor. However, these also simply mimic traditional in-person learning environments.

Further, these conventional online learning techniques merely provide one-way interaction, wherein instruction is disseminated by an instructor and the learners receive tests to evaluate the knowledge they retained. However, one-way interactions are not effective teaching methods for skill-based learning in a remote online environment, especially for skills that must be demonstrated. Moreover, traditional testing is not always an appropriate means for evaluating skill-based learners' creativity, problem solving, artistic ability, and practical skill performance.

Accordingly, there is a need for systems and methods that address the deficiencies and problems in conventional approaches.

SUMMARY

Conventional online learning platforms (Blackboard®, YouTube®, or Peloton Yoga®) encourage learners to follow along and mimic the actions occurring in the videos as they watch them. These methods lack substantive learner participation in the platform. When learners simply follow along with a video, their skill demonstrations are not stored by the learning platform, nor are they typically seen or critiqued by an expert. Because these platforms do not engage the learner in active, recorded participation, they cannot facilitate the learner's skill growth comparably to a platform that does allow for all the skill-acquisition opportunities (custom expert feedback, self-check, etc.) that are enabled through storing learner skill demonstrations.

When learners have access to their own stored learner skill demonstrations, especially through self-check modules, they are much more able to track their own skill growth, set goals, realize progress, and critique their own form. Custom expert feedback also utilizes stored learner skill demonstrations to the benefit of learner skill acquisition.

A non-exhaustive list of skill-based learning uses for which the system may be used include standardized test taking, fitness and athletics, performing arts, gaming, cooking, woodworking, visual arts, creative writing, design, foreign language, public speaking, coding, auto mechanics, and skincare and lifestyle, to name a few. The system will be used to introduce beginning learners to new skills and to aid intermediate and advanced learners in increasing their skill level in a given activity.

The instant systems and methods address the deficiencies in conventional systems by providing a platform to improve skill-based learning outcomes through asynchronous expert guidance and computer-facilitated skill review. In the current arts, almost all skill-based learning is done live (meaning, not asynchronously) whether it is done through a technology product (such as Zoom®, Play with a Pro®, or Varsity Tutors®) or in the real world. In order to receive customized feedback on their individual skill demonstrations (and hence have the opportunity to improve their skills), the learner has had to occupy the same space and time with the expert, and typically book time with an expert on the scale of hour-long lessons or longer. This system allows the learner to remotely gain the benefit of expert feedback in smaller doses, more frequently, at a lower cost, and at any time of day they choose. Learners are also enabled to view metrics regarding their individual skill demonstrations and to access the expert feedback via media packages that are recorded for ongoing review by the learner; all of which offer a significant advantage to learners over conventional approaches.

Frequency of expert feedback is central to learner skill acquisition (consider the following case of two dancers at the same skill level: one dancer is corrected on his plié form every day and another dancer is corrected on his plié form once every two weeks; the dancer getting the correction every day will learn proper form much faster), but few learners have the time, means, and flexibility to access an expert's time using traditional means on a daily basis. The system makes frequent and persistent feedback an accessible reality for learners.

Complex interactivity greatly aids the learning process. Much of online learning, skill-based and non-skill-based, is done through one-way video courses that may involve simple quizzes following lesson videos. These quizzes are often considered "interactive" opportunities for the learner, but they take the form of simple assessments, such as multiple-choice questions that test comprehension of concepts explained in a video, written, or audio lesson. For skill-based learning, however, comprehension and retention of concepts explained in a video lesson do not, on their own, improve a learner's skill. There is a significant difference between comprehension of a concept (what can be tested by a simple multiple-choice quiz) and demonstration of a skill (requiring more novel forms of learner interaction). Allowing for skill demonstration within a learning platform requires that the learning system accept learner interactions that are not designed to be graded by conventional software-based assessments. The system accepts many file formats (video, photo, written text, etc.) within user skill demonstration interactions, allowing for a true demonstration of many types of learner skills (from painting to dance to cooking, etc.). Storing these user skill demonstrations within the system and leveraging them in novel ways throughout the platform opens up far more opportunities for learner growth outside of automated grading of simple quizzes.

Determining that progress is being made is additionally important to the learning experience. Conventional systems have not solved the problem of quantifiably measuring the progress of a skill-based learner. However, the instant system is configured to analyze media packages received from learners and experts, link elements between various features of the media packages, users profiles, and data stored in databases, and to cross reference and infer relationships between disparate learner and expert data points. The system is configured to leverage such analysis and identified relationships to generate metrics that quantify a learner's progress, potentially utilizing artificial intelligence to do so.

In one embodiment, a system is provided for providing an interactive asynchronous video learning platform, including at least one user computing device in operable connection with a network. An application server is in operable communication with the user network to host an application program for providing a platform for interactive asynchronous video learning. The application program includes a user interface module for providing access to the application program through the user computing device. A learning module provides at least one prompt and at least one learner skill demonstration. A self-check module provides a guided review of a learner's previously submitted learner skill demonstration. For example, students may watch their previously submitted learner skill demonstration and record a video with play-by-play style commentary, they may write a reflection, they may grade themselves using a rubric, or they may record an audio critique. In addition, any of these activities may be used to self-check one or more previously submitted learner skill demonstrations against another, through a comparative lens.

In another non-limiting embodiment, the implementation of these novel systems, computer-implemented methods, and non-transitory computer-readable mediums, may involve configuring components, implementing methods, and/or storing computer instructions for validating access permissions associated with one or more user devices and providing access to the interactive asynchronous video learning platform to one or more validated user devices; wherein each of the one or more validated user devices has a corresponding unique user profile. The implementation may further involve receiving a selection of at least one skill module on each respective unique user profile corresponding to the one or more validated user devices. This approach may additionally include transmitting one or more time-dependent prompts to the one or more validated user devices and receiving, on each respective unique user profile, one or more user media packages in a first format from the one or more validated user devices in response to the time-dependent prompts; wherein the one or more media packages are associated with the at least one skill module. The system may then convert the one or more media packages from the first format to a standardized asynchronous format and maintain the one or more user media packages in the standardized asynchronous format and one or more expert media packages on each unique user profile, such that the content of the one or more user media packages and the one or more expert media packages can be simultaneously evaluated. The system may then receive, on each respective unique user profile, an evaluation package from the one or more validated user devices and determine one or more metrics corresponding to each unique user profile based on its corresponding evaluation package.

The implementation of these novel systems, computer-implemented methods, and non-transitory computer-readable mediums, may additionally involve configuring components, implementing methods, and/or storing computer instructions comprising wherein the time-dependent prompts correspond to time-related frequency parameters associated with the at least one skill module; wherein the one or more media packages include data associated with a learner skill demonstration; wherein converting the one or more media packages to a standardized asynchronous format includes, modifying metadata associated with the one or more media packages, modifying length of the one or more media packages, and modifying dimensions of the one or more media packages; wherein the one or more media packages and the one or more expert media packages are embedded in an interactive GUI such that side-by-side visual comparisons may be conducted by a user utilizing the interactive GUI; an interactive GUI configured to transmit instructions to query a storage device, such that the self-evaluation package and one or more previous self-evaluation packages are simultaneously selectable via the interactive GUI; and one or more metrics associated with learner frequency, learner self-assessment, and learner progress, are modified based on the self-evaluation package.

In another non-limiting embodiment, the implementation of these novel systems, computer-implemented methods, and non-transitory computer-readable mediums, may involve configuring components, implementing methods, and/or storing computer instructions for receiving a selection of at least one skill module from a user device; retrieving one or more expert profiles and one or more skill modules associated with the at least one skill module in response to the selection. This implementation may further include receiving a selection of an expert profile from the one or more expert profiles and a selection of a skill module from the one or more skill modules and receiving a media package from the user device, wherein the media package is associated with the skill module. This approach may additionally include modifying the media package from a first format to a second format configured for asynchronous evaluation. This implementation may additionally include assigning the media package in the second format to the expert profile and populating a user profile with expert feedback from an expert device. Further, this approach may involve receiving a self-evaluation package from the user device and populating the user profile with a media package from the expert device, wherein the media package is associated with the skill module and expert feedback.

The implementation of these novel systems, computer-implemented methods, and non-transitory computer-readable mediums, may additionally involve configuring components, implementing methods, and/or storing computer instructions comprising wherein the media package is received in response to at least one time-dependent prompt corresponding to one or more time-related frequency parameters associated with the at least one skill module; wherein the media package includes data associated with a learner skill demonstration; modifying the media package further comprises converting the media package to a standardized asynchronous format by modifying metadata associated with the media package, modifying a time-related length of the media package, and modifying dimensions of the media package; wherein the media package and one or more expert media packages are embedded in an interactive GUI such that side-by-side visual comparisons may be conducted by a user utilizing the interactive GUI; and an interactive GUI configured to transmit instructions to query a storage device, such that the self-evaluation package and one or more previous self-evaluation packages are simultaneously selectable via the interactive GUI.

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

In general, the embodiments described herein relate to systems and methods for providing an interactive asynchronous video learning platform. The system includes learning modules and self-check modules to provide an interactive and customizable learning experience. The embodiments overcome a technical hurdle that has, to this point, precluded skill-based learning from being achieved at scale through a single technology product. Indeed, these novel systems and methods improve upon conventional systems by providing an asynchronous learning platform configured to facilitate remote skill-based learning including recorded expert feedback, receive/analyze/modify/transmit media packages, and generate metric data by cross-referencing disparate data.

Figure 1:
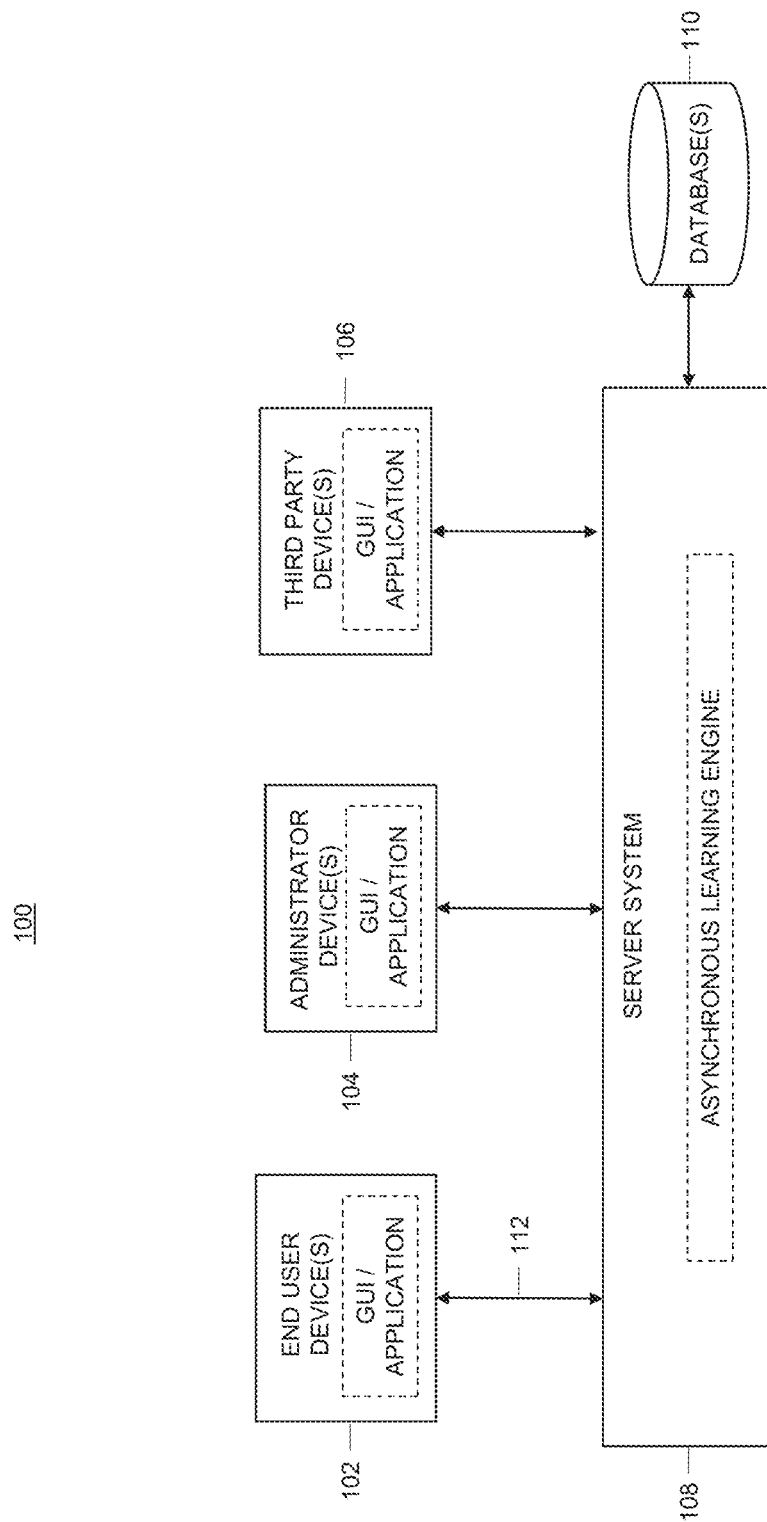
FIG. 1 illustrates a computing environment, according to various embodiments of the present disclosure.

Referring to FIG. 1, computing environment 100 can be configured to provide an interactive asynchronous video learning system, according to embodiments of the present disclosure. Computing environment 100 may include one or more user device(s) 102, administrator device(s) 104, third-party device(s) 106, one or more database(s) 110, communicatively coupled to the server system 108. The user device(s) 102, one or more administrator device(s) 104, third-party device(s) 106, server system 108, and database(s) 110 may be configured to communicate through network 112.

In one or more embodiments, user device(s) 102 is operated by a user. User device(s) 102 may be representative of a mobile device, a tablet, a desktop computer, or any computing system having the capabilities described herein. Users may include, but are not limited to, individuals such as learners, students, companies, prospective clients, and/or customers of an entity associated with server system 108, such as individuals who are interacting with server system 108 by utilizing the services of, or consultation from, an entity associated with server system 108.

User device(s) 102 according to the present disclosure may include, without limit, any computing devices configured to capture, receive, store and/or disseminate any suitable data. In one embodiment, a user device(s) 102 includes a non-transitory memory, one or more processors including machine readable instructions, a communications interface which may be used to communicate with the server system (and, in some examples, with the database(s) 110), a user input interface for inputting data and/or information to the user device, and/or a user display interface for presenting data and/or information on the user device. In some embodiments, the user input interface and the user display interface are configured as an interactive graphical user interface (GUI). The user device(s) 102 are also configured to provide the server system 108, via the interactive GUI, input information such as user actions (e.g., media packages, in-session information, user features, user preferences, user settings, user profile information, and the like) for further processing. In some embodiments, the interactive GUI is hosted by the server system 108 or provided via a client application operating on the user device. In some embodiments, a user operating user device(s) 102 may query server system 108 for information related to a service provided by an entity hosting server system 108. Users operating user device(s) 102 may additionally establish credentials, create a user profile, and interact with the learning and self-check modules of the system.

In one or more embodiments, administrator device(s) 104 is operated by a user under the supervision of the entity hosting and/or managing server system 108. Administrator device(s) 104 may be representative of a mobile device, a tablet, a desktop computer, or any computing system having the capabilities described herein. Users of the administrator device(s) 104 include, but are not limited to, individuals such as, for example, principals, employees, software engineers, database administrators, employees, and/or customer service agents, of an entity associated with server system 108.

Administrator device(s) 104 according to the present disclosure include, without limit, any combination of computing devices configured to capture, receive, store and/or disseminate any suitable data. In one embodiment, each administrator device(s) 104 includes a non-transitory memory, one or more processors including machine readable instructions, a communications interface that may be used to communicate with the server system (and, in some examples, with the database(s) 110), a user input interface for inputting data and/or information to the user device and/or a user display interface for presenting data and/or information on the user device. In some examples, the user input interface and the user display interface are configured as an interactive GUI. The administrator device(s) 104 are also configured to provide the server system 108, via the interactive GUI, input information (e.g., queries, user information, tags, links, code, text, and the like) for further processing. In some examples, the interactive GUI may be hosted by the server system 108 or it may be provided via a client application operating on the user device.

In one or more embodiments, third-party device(s) 106 are operated by a user. Third-party device(s) 106 may be representative of a mobile device, a tablet, a desktop computer, or any computing system having the capabilities described herein. Users of the third-party device(s) 106 include, but are not limited to, an expert or entity providing consultation or expert advice to users operating user device (s) 102 or users accessing computing environment 100.

Third-party device(s) 106 according to the present disclosure include, without limit, any combination of computing devices configured to capture, receive, store and/or disseminate any suitable data. In one embodiment, each third-party device(s) 106 includes a non-transitory memory, one or more processors including machine readable instructions, a communications interface that may be used to communicate with the server system (and, in some examples, with the database(s) 110), a user input interface for inputting data and/or information to the user device, and/or a user display interface for presenting data and/or information on the user device. In some examples, the user input interface and the user display interface are configured as an interactive GUI. The third-party device(s) 106 are also configured to provide the server system 108, via the interactive GUI, input information (e.g., queries, user information, tags, links, code, text, and the like) for further processing. In some examples, the interactive GUI may be hosted by the server system 108 or it may be provided via a client application operating on the user device.

The server system 108 includes one or more processors, servers, databases, communication/traffic routers, non-transitory memory, modules, and interface components. In one or more embodiments, server system 108 hosts, stores, and operates an asynchronous learning engine. Server system 108 may be configured to maintain several modules and host an interactive asynchronous video learning platform. Server system 108 may further facilitate remote skill-based learning via the interactive asynchronous video learning platform. Server system 108 may be further configured to validate access permissions associated with user device(s) 102, administrator device(s) 104, and third-party device(s) 106, and receive a selection of skill-based learning modules. Server system 108 is additionally configured to receive, analyze, modify, and transmit/stream media packages to/from end user device(s) 102 and administrator device(s) 104, and third-party device(s) 106, in real-time. Server system 108 is further configured to maintain media packages (from both user device(s) 102 and administrator device(s) 104) in a persistent manner, such that they are accessible throughout a learner's skill-based learning plan and/or while a learner's access permissions are valid. Server system 108 may receive evaluation packages from user device(s) 102, administrator device(s) 104, and third party device(s) 106, and additionally determine one or more metrics associated with a learner's skill-based performance. Server system 108 is additionally configured to analyze data associated with user/expert profiles and media packages and various data in order to identify unique relationships from disparate data.

Moreover, the server system 108 may include security components capable of monitoring user rights and privileges associated with initiating API requests for accessing the server system 108 and modifying data in the database(s) 110. Accordingly, the server system 108 may be configured to manage user rights, manage access permissions, object permissions, users' peer-to-peer communication, and the like. The server system 108 may be further configured to implement two-factor authentication, secure sockets layer (SSL) protocols for encrypted communication sessions, biometric authentication, and token-based authentication.

Database(s) 110 may be locally managed, and/or may be a cloud-based collection of organized data stored across one or more storage devices. Database(s) 110 may be complex and developed using one or more design schema and modeling techniques. Database(s) 110 may be hosted at one or more data centers operated by a cloud computing service provider. Database(s) 110 may be geographically proximal to or remote from the server system 108 and is configured for data storage management, multi-user access control, data integrity, media store, data querying/filtering, backup and recovery management, database access language application programming interface (API) management, and the like. Database(s) 110 is in communication with server system 108, end user device(s) 102, administrator device(s) 104, and third-party device(s) 106, via network 112. Database(s) 110 stores various data, including skill-module content, media packages, media tag information, and data relationship information that can be modified and leveraged by server system 108, user device(s) 102, administrator device (s) 104, and third-party device(s) 106. Additionally, the database(s) 110 may be deployed and maintained automatically by one or more components shown in FIG. 1.

Network 112 may be of any suitable type, including individual connections via the Internet, cellular, or Wi-Fi networks. In some embodiments, network 112 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 108 may be proprietary and/or may be examples available to those of ordinary skill in the art such as Amazon® Web Services (AWS) APIs or the like.

Figure 2:
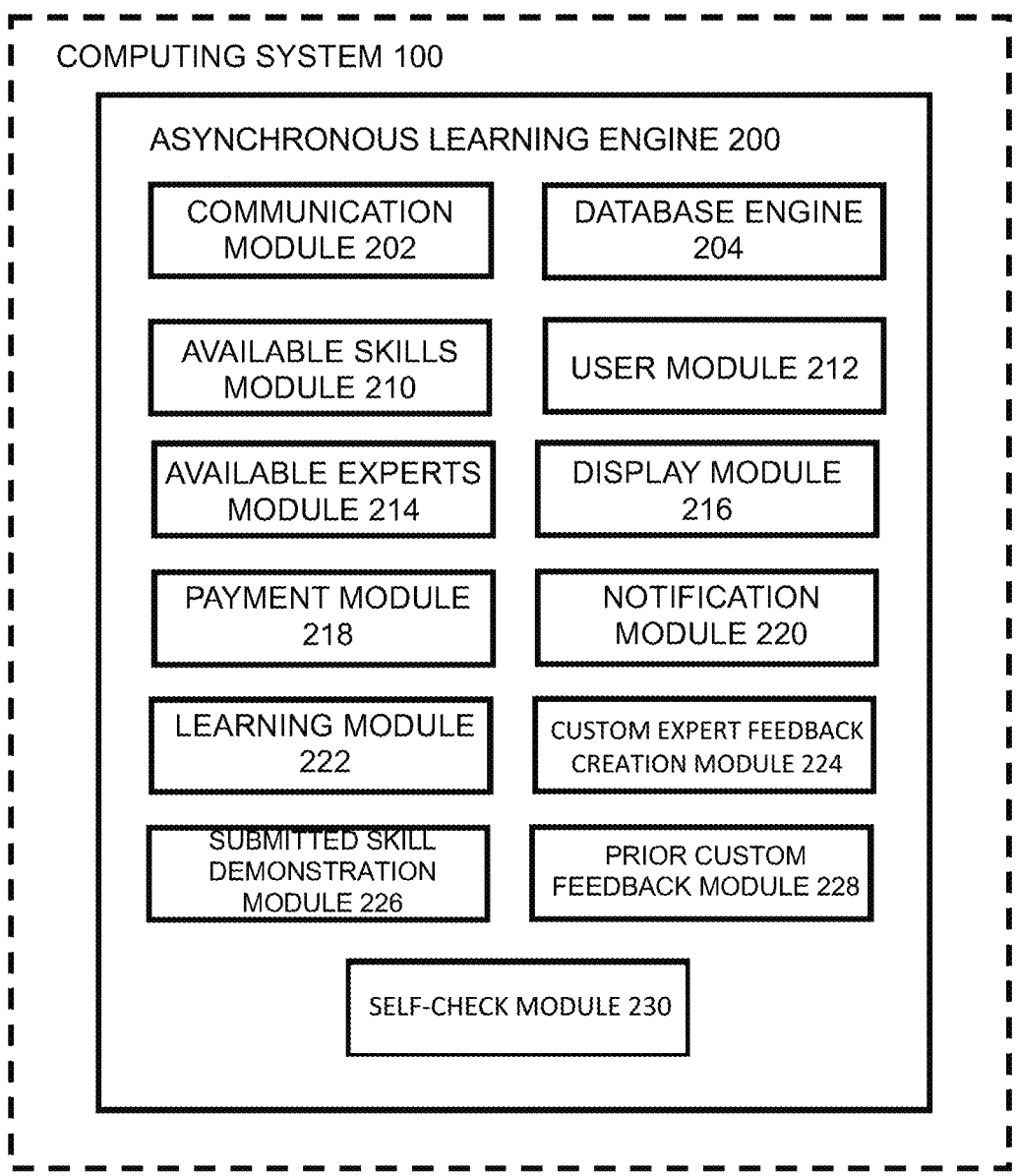
FIG. 2 illustrates a block diagram of a computing system and an application program, according to various embodiments of the present disclosure.

Referring to FIG. 2, computing environment 100 may include operating asynchronous learning engine 200 which comprises one or more modules having the necessary routines and data structures for performing specific tasks, and one or more engines configured to determine how the platform manages and manipulates data. In some embodiments, the asynchronous learning engine 200 comprises one or more of a communication module 202, a database engine 204, an available skills module 210, a user module 212, an available experts module 214, and a display module 216, a payment module 218, a notification module 220, a learning module 222, a custom expert feedback creation module 224, a submitted skill demonstration module 226, a prior custom feedback module 228, and a self-check module 230.

In some embodiments, the communication module 202 is configured for receiving, processing, and transmitting a user command and/or one or more data streams. In such embodiments, the communication module 202 performs communication functions between various devices, including the end user device(s) 102, administrator device(s) 104, and third-party device(s) 106. In some embodiments, the communication module 202 is configured to allow one or more users of the computing environment 100, including a third-party, to communicate with one another. In some embodiments, the communication module 202 is configured to maintain one or more communication sessions with one or more servers, the administrator device(s) 104, and/or one or more third-party device(s) 106. In some embodiments, the communication module 202 allows each user to transmit and receive information which may be used by the system.

In some embodiments, a database engine 204 is configured to facilitate the storage, management, and retrieval of data to and from one or more storage mediums, such as the one or more database(s) 110 described herein. In some embodiments, the database engine 204 is coupled to an external storage system. In some embodiments, the database engine 204 is configured to apply changes to the one or more database(s). In some embodiments, the database engine 204 comprises a search engine component for searching through thousands of data sources stored in different locations. The database engine 204 allows each user and module associated with the system to transmit and receive information stored in various databases. The database engine 204 may be further configured to receive and respond to queries and store relationships associated with various data points.

In some embodiments, the available skills module 210 is configured to allow the user (e.g., a user operating end user device(s) 102, administrator device(s) 104, or third-party device(s) 106) to engage with various skills and skill exercises provided by the application program.

In some embodiments, the user module 212 facilitates the creation of a user account for the computing environment 100. The user module 212 may allow the user to input account information, user credentials, and the like. The user module 212 may be configured to regulate access permissions associated with users accessing computing environment 100. Regulating access permissions may include maintaining a log of valid/invalid usernames and user credentials. User module 212 may be configured to disseminate and regulate user access tokens and further regulate peer-to-peer communication between users accessing computing environment 100.

In some embodiments, the available experts module 214 allows the user to select an expert to transmit a completed task for review. The available experts module 214 may act autonomously to automatically select a suitable available expert. Available experts module 214 may respond to database queries or automatically generate a list of available experts based on tags/links that have been assigned to the selected skill or tags/links associated with elements (e.g., media, metrics, feedback, and the like) on a user profile. In another embodiment, the expert is automatically selected by available experts module 215 because the interactive asynchronous video learning system is being made available to the learner through the expert as a service. In this instance, the expert may host its own electronic portal for accessing the interactive asynchronous video learning system and/or the expert may provide access to the interactive asynchronous video learning system through computing environment 100.

In some embodiments, the display module 216 is configured to display one or more graphic user interfaces, including, e.g., one or more user interfaces, one or more consumer interfaces, one or more video presenter interfaces, etc. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in the display module 216 may not be persistently stored.

In some embodiments, the payment module 218 provides a means for receiving payment from the user (e.g., a learner operating user device(s) 102) and/or transmitting payment to an expert (e.g., user operating third-party device(s) 106) for completing a review and providing feedback. Payment module 218 may communicate with one or more other modules and/or individual components with computing environment 100 to grant or deny user access to computing environment 100.

In some embodiments, the notification module 220 is configured to transmit notifications to users (i.e., a learner, expert, and/or administrator) of the system. Notification module 220 may be configured to communicate with one or more other modules. Notification module 220 may be configured to notify a learner, expert, or administrator to perform a certain task or to transmit reminders.

In some embodiments, the learning module 222 is configured to allow the user to interact with a series of learning modules, including tasks associated with each of the learning modules. This may include prompts to address user skills, as well as learner skill demonstrations.

In some embodiments, the custom expert feedback creation module 224 is configured to allow an expert to create a feedback report.

In some embodiments, a submitted skill demonstration module 226 allows the system and users thereof to interact with previously submitted skill demonstrations.

In some embodiments, the prior custom feedback module 228 permits users of the system to interact with prior custom feedback reports. Submitted skill demonstration module 226 may be configured to analyze data associated with submitted media packages and parse the media packages for relevant metadata and/or video data, image data, audio data, text data, and the like. Submitted skill demonstration module 226 may automatically assign tags to received media packages based on the data parsed from the media packages. Tags/links may additionally be assigned by learners, experts, or administrators. Submitted skill demonstration module 226 may be configured to identify relationships between tags/links, a received media package, a user profile, or an expert profile, such that metrics and previously unknown connections between these disparate data types can be identified.

In some embodiments, the self-check module 230 allows for users to perform self-checks of tasks when interacting with the learning module 222. Self-check module 230 may dynamically modify an interactive asynchronous video learning platform to enable a user to submit input indicative of a self-reflection. Self-check module 230 may communicate with one or more modules and components in computing environment 100, including but not limited to, submitted skill demonstration module 226 and/or prior custom feedback module 228.

Figure 3:
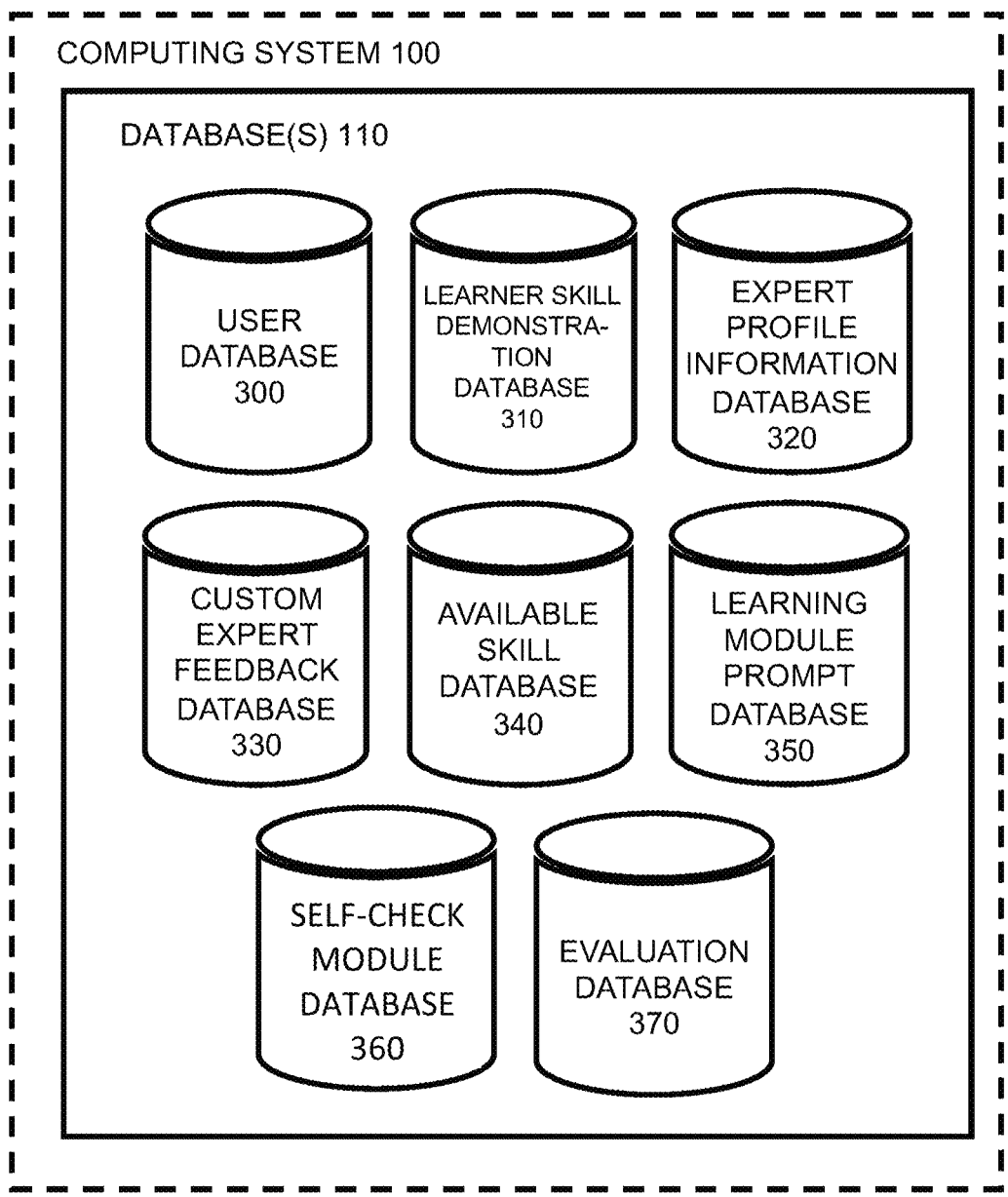
FIG. 3 illustrates a block diagram of databases in communication with the application program, according to various embodiments of the present disclosure.

FIG. 3 illustrates a plurality of databases associated with database(s) 110, discussed in relation to FIG. 1. The databases may include a user database 300, a learner skill demonstration database 310, an expert profile information database 320, a custom expert feedback database 330, an available skill database 340, a learning module prompt database 350, a self-check module database 360, and an evaluation database 370.

Figure 4:
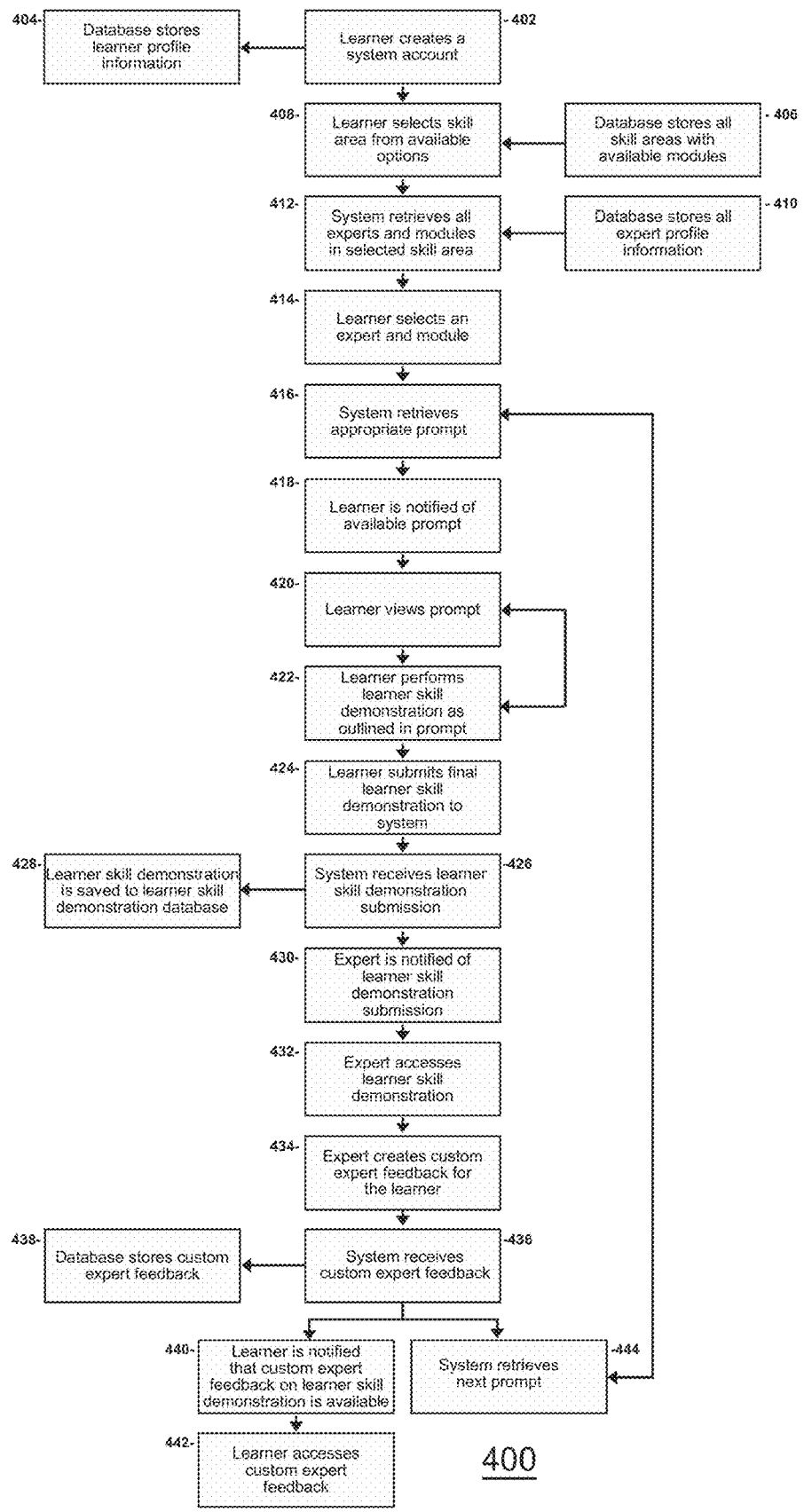
FIG. 4 illustrates a flowchart of a method implemented by a learning module, according to various embodiments of the present disclosure.

FIG. 4 illustrates a flowchart of a method 400 implemented by a learning module 222. At 402, a learner (operating user device(s) 102) may create an account on an interactive asynchronous video learning platform associated with server system 108. At 404, database(s) 110 may maintain and store learner profile information, such as username, demographic information, payment information, and the like. At 406, database(s) 110 may be configured to maintain and store various skills modules related to a variety of learning areas that are made available to learners operating user device(s) 102. At 408, a learner may select a skill from the available options offered by the interactive asynchronous video learning platform. At 410, database(s) 110 may maintain and store expert profile information including, but not limited to, username information, expert profile information, expert compensation information, and the like. At 412, server system 108 may retrieve skill modules associated with the skill selected by the learner at 408. At 414, server system 108 may receive an indication that the learner selected an expert and a specific module to begin their learning experience on the interactive asynchronous video learning platform. At 416, the interactive asynchronous video learning platform, via server system 108, may retrieve one or more appropriate prompts for the learner.

Prompts may address the skill the learner will be asked to perform in a subsequent learner skill demonstration. Prompts may take the form of demonstration of skills, advice regarding the skills, and/or instructions that tell the learner how to perform and submit their learner skill demonstration. Prompts include, but are not limited to, video, audio, image, and written text formats.

At 418, the learner may be notified on the user device(s) 102 about the one or more prompts retrieved at 416. At 420, server system 108 may receive an indication that the learner has interacted with or received the one or more prompts. At 422, the learner performs the learner skill as outlined in the one or more prompts. Here, the learner's performance may be captured in a media format, such that it can be transmitted to the interactive asynchronous video learning platform. 420-422 may be repeated or looped through the sequence of prompt(s) to ensure that the learner has satisfactorily performed the entire sequence of prompts. At 424, the learner may submit one or more learner skill demonstrations to the interactive asynchronous video learning platform in the form of a media package. The media package may include, but is not limited to, the following forms, all intended to demonstrate the learner's skill level regarding the skill the learner was instructed to perform in the prompt: video, audio, photo, PDF, etc. In some instances, the media package is created on user device(s) and uploaded to server system 108. In other instances, the media package is created on the interactive asynchronous video learning platform.

At 426, the interactive asynchronous video learning platform may receive the learner's one or more skill demonstrations as a media package. At 428, the one or more learner skill demonstrations (in the form of a media package) may be saved in the one or more database(s) 110 (e.g., learner skill demonstration database 310). At 430, the expert is notified of the one or more learner skill demonstrations being received. At 432, server system 108 may receive an indication that the expert has accessed the one or more learner skill demonstrations. In some embodiments, learner skill demonstrations may involve direct performance of the skill by the learner, but learner skill demonstrations may vary to include the user demonstrating their ability to meta-cogitate regarding the skills they have explored throughout the learning module. Notably, the ability to meta-cogitate regarding one's own skill level is itself a demonstration of said skill.

At 434, server system 108 may receive an indication and one or more media packages indicative of a custom expert feedback package for the learner, wherein the custom expert feedback package is responsive to the one or more learner skill demonstrations. At 436, the interactive asynchronous video learning platform may receive the custom expert feedback package from the expert (e.g., an expert operating third-party device(s) 106). At 438, database(s) 110 may store the custom expert feedback package for one or more downstream processes. Server system 108 may associate each learner skill demonstration in database(s) (e.g., learner skill demonstration database 310) with the learner that submitted the learner skill demonstration. The learner skill demonstration database may take the form of a third-party service integration.

At 440, the learner is notified that the custom expert feedback package is available for the learner to access on the interactive asynchronous video learning platform. At 442, server system 108 receives an indication that the learner has accessed the custom expert feedback package from user device(s) 102. At 444, given that there may be more than one skill-based module that the learner needs to respond to in their learning curriculum and/or based on the skill being learned, the learner may receive their next prompt associated with the next skill module for their learning experience. Notably steps 418 through 444 may loop and repeat while the learner is still actively participating in the skill-based learning experience and/or until the learner's skill-based learning experience is complete.

Figure 5:
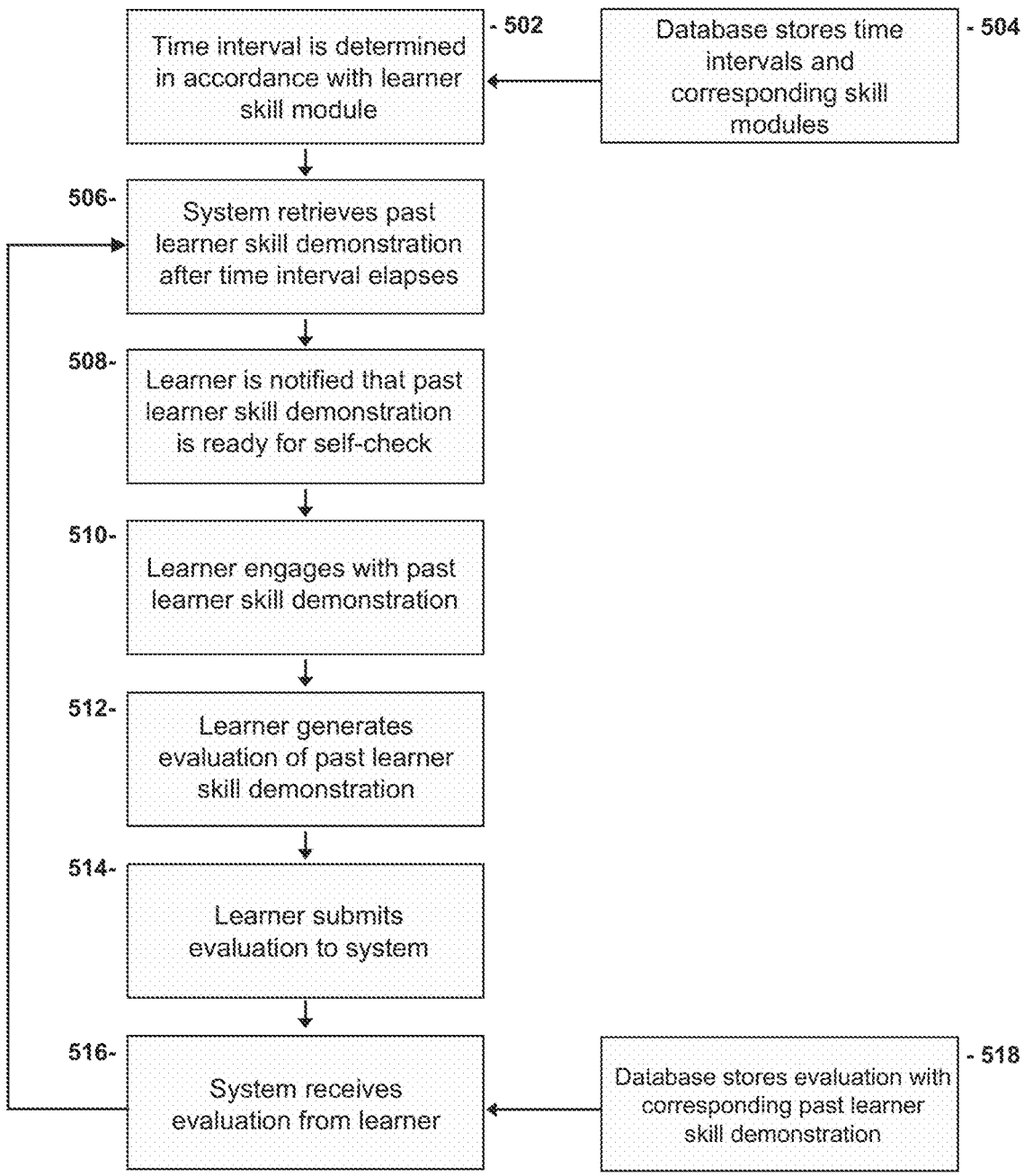
FIG. 5 illustrates a flowchart of a method implemented by a self-check module, according to various embodiments of the present disclosure.

Referring to FIG. 5, a flowchart of a method 500 implemented by a self-check module, according to various embodiments of the present disclosure is depicted. At 502, a time interval associated with a learner self-check task is determined in accordance with the parameters of the selected skill module discussed in FIG. 4. For example, after an amount of time has elapsed, the learner will be prompted to perform a self-check. A self-check is a learner-performed-via-a-system guided review of a learner's previously submitted learner skill demonstration. The purpose of the self-check is to facilitate further skill development in the learner through personal guided skill review. Specific time intervals will be customized per skill being developed. The time between learner skill demonstration submission and the self-check of that learner skill demonstration may be a matter of days, weeks, months, or years depending on the skill being learned. While time intervals may be measured in calendar days, they may also be measured in number of learner skill demonstrations submitted by the learner or some combination of calendar days and number of learner skill demonstration submissions. The learner may then receive a notification that their learner skill demonstration(s) is ready for a self-check. Notifications may take a variety of forms, including but not limited to: email notification(s), notifications within the application program, and/or SMS notifications.

At 504, database(s) 110 may maintain and store time intervals and corresponding skill modules.

At 506, server system 108 may retrieve past learner skill demonstrations. At 508, the learner is notified that past learner skill demonstrations are available for self-check.

At 510, server system 108 may receive an indication that the learner is engaging with one or more past learner skill demonstrations. Here, in some embodiments, the learner engages with previously submitted learner skill demonstration(s). Depending on the format of the learner's stage of skill acquisition and the learner skill demonstration in question, learner self-check may take many forms, including but not limited to watching, listening, reading, or looking at one or multiple previously submitted learner skill demonstration(s) and/or accompanying expert review. The goal of facilitating learner engagement with previously submitted learner skill demonstration(s) is to allow the learner to notice comparative progress/changes in their previously submitted learner skill demonstration over time and/or after a specific time interval has elapsed.

At 512, the server system 108 may receive an indication that a learner has generated an evaluation of one or more past learner skill demonstration(s). Useful observations the learner may have from engaging with their previously submitted learner skill demonstration include, but are not limited to: learner habits, strengths/defects in learner skills, patterns in learner skill performance, and strengths/weaknesses in related skills. The learner may generate evaluations of past learner skill demonstrations. Learner evaluations record observations gained through engaging with their previously submitted learner skill demonstration(s). Evaluations may take various forms, including but not limited to: file upload (video, audio, photo, PDF, etc.), video (recorded in-platform), written text, audio (recorded in-platform), multiple choice selection, True/False selection, and grading on a scale (for instance, from 1 to 10 or A, B, C, D, F).

At 514, server system 108 may receive an indication that the learner has submitted their evaluation via the interactive asynchronous video learning platform.

At 516, the server system 108, via the interactive asynchronous video learning platform, may receive the evaluation from the learner (i.e., user device(s) 102). At 518, server system 108 may store the evaluation with corresponding past learner skill demonstrations. Here, in some embodiments, the server system 108 stores the learner evaluation in database(s) 110 (e.g., in self-check module database 360) and associates each evaluation in the database(s) 110 with the learner that submitted the evaluation.

Figure 6:
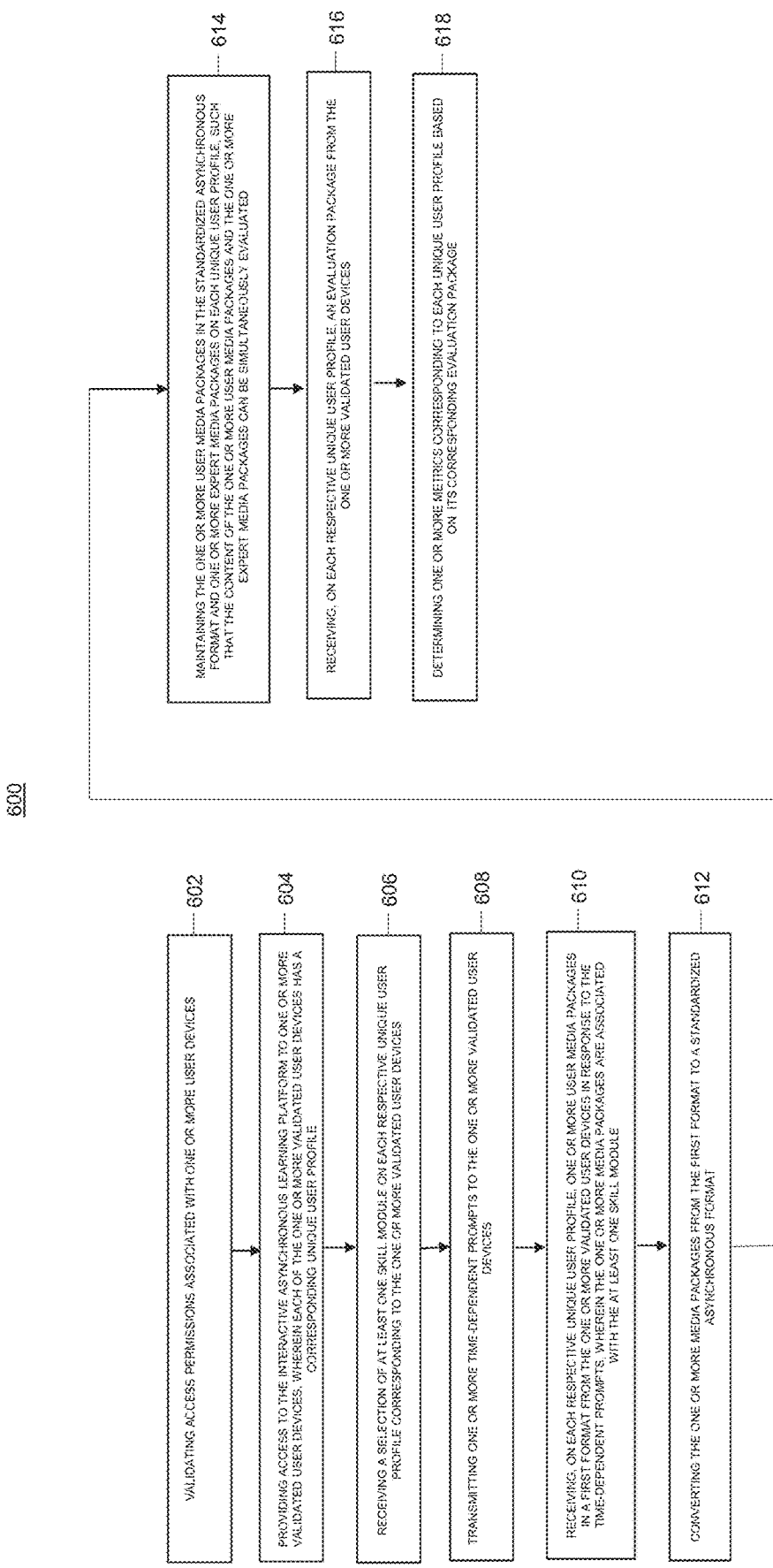
FIG. 6 illustrates a method for providing asynchronous learning, according to various embodiments of the present disclosure.

Referring to FIG. 6, a method 600 for providing asynchronous learning is depicted, according to various embodiments of the present disclosure. At 602, server system 108 may validate access permissions associated with one or more user devices. For example, the server may analyze one or more of user access permissions, access tokens, user credentials, and the like, to determine if a user accessing computing environment 100 has permission to do so. Here, server system 108 validates user device(s) 102 that have approved access permissions and rejects user device(s) that do not.

At 604, server system 108 may provide access to the interactive asynchronous video learning platform to one or more validated user devices. Here, server system 108 may only provide each of the one or more validated user devices (i.e., user device(s) 102) access to their corresponding unique user profile, and simultaneously preventing the validated user device(s) from accessing sections of the platform that they do not have permission to access.

At 606, server system 108 may receive a selection of at least one skill module from each respective unique user profile corresponding to the one or more validated user devices. As discussed in relation to FIG. 4, each learner may select one or more skill(s)/area(s) of interest while accessing the interactive asynchronous video learning platform. Computing environment 100 may be configured to host the interactive asynchronous video learning platform and further enabled to receive a skill selection from multiple learners.

At 610, server system 108 may transmit one or more time-dependent prompts to the one or more validated user devices. Here, server system 108 may push prompts to user device(s) 102 and/or via the interactive asynchronous video learning platform to notify a user that a skill associated with the skill module that the learner is currently assigned is required to be performed. Notably, the prompts may require that the learner perform the skill within a certain amount of time or set a time limit for the learner to demonstrate the skill live on the interactive asynchronous video learning platform or via a media package. Time-dependent prompts may prevent the learner from advancing or accessing certain sections of the interactive asynchronous video learning platform if the required skill or task is not submitted. At 610, the server system may receive, from each respective unique user profile, one or more user media packages in a first format from the one or more validated user devices in response to the time-dependent prompts, wherein the one or more media packages are associated with the at least one skill module. As discussed above in relation to 608, learners may submit a media package to the interactive asynchronous video learning platform, in response to receiving a time-dependent prompt. Here, the media packages may include a skill-based demonstration created by the learner in response to one or more parameters and requirements in the learner's skill module. The media packages may include a video, text, audio, images, charts, and the like.

At 612, server system 108 may then convert the one or more media packages from the first format to a standardized asynchronous format. For example, the learner may record a skill-demonstration as a video via user device(s) 102. The video may initially be in a format that is raw, too lengthy, improper dimension, lacks appropriate metadata, or may be unusable by the interactive asynchronous video learning platform. Server system 108 may be configured to convert the video into a second format that is standardized for the interactive asynchronous video learning platform. In some instances, this may include, but is not limited, to injecting metadata including learner, expert, and skill module identifying information into the video. This may additionally include modifying the video and/or splitting a lengthy video (exceeding a predetermined time limit) into shorter videos. This may further include assigning tags (e.g., media tags)/ links to the video and/or embedding the video into certain regions within the interactive asynchronous video learning platform.

At 614, server system 108 may maintain the one or more user media packages in the standardized asynchronous format and one or more expert media packages on each unique user profile, such that the content of the one or more user media packages and the one or more expert media packages can be simultaneously evaluated. Here, the interactive asynchronous video learning platform may be configured to dynamically display the contents (i.e., recorded skill demonstrations) of more than one submitted media package (i.e., multiple past learner skill demonstrations) simultaneously (e.g., in rows, columns, side-by-side), such that the learner can comparatively view their previously submitted skill demonstrations and/or comparatively view their skill demonstrations next to expert demonstrations or feedback. Notably, the contents of the one or more media packages may be recorded, streamed/demonstrated in real-time, and/or a combination of both pre-recorded and real-time. Further, the contents of the media package may include more than one medium (e.g., a combination of video, image, audio, text, and the like). This system improves upon conventional systems by enabling the simultaneous viewing of remotely submitted learner skill demonstrations and remotely submitted expert demonstrations and feedback.

At 616, server system 108 may receive, on each respective unique user profile, an evaluation package from the one or more validated user devices. Here, a learner may generate an evaluation according to one step discussed in relation to FIG. 5 (e.g., 512).

At 618, server system 108 may determine one or more metrics corresponding to each unique user profile based on its corresponding evaluation package. Here, server system 108 may be configured to dynamically populate the interactive asynchronous video learning platform with metrics related to the learner's progress, frequency, or activity, and self-graded and expert-provided feedback. In furtherance of generating metrics, server system 108 may implement one or more processes including but not limited to, analyzing metadata in submitted media packages, analyzing access logs associated with the interactive asynchronous video learning platform, determining the number of skill modules remaining relative to a particular date or current skill module of the learner. Server system 108 may additionally analyze tags assigned to various elements of the learner's user profile and media packages such that relationships between unrelated disparate data points may be identified. For example, tags and data associated with the frequency, length, and number of submitted videos, may be compared from one learner to other learners to identify if a learner is advancing too slowly or quickly through a skill-based curriculum. This information can be used to modify the generated metrics, provide notifications to the learner, and/or prompt specific feedback from an expert.

Notably, users operating user device(s) 102, administrator device(s) 104, third-party device(s) 106, may experience different user flows and/or have access to different features of the interactive asynchronous video learning platform depending on which type of devices they are operating (i.e., their roles).

Figure 7:
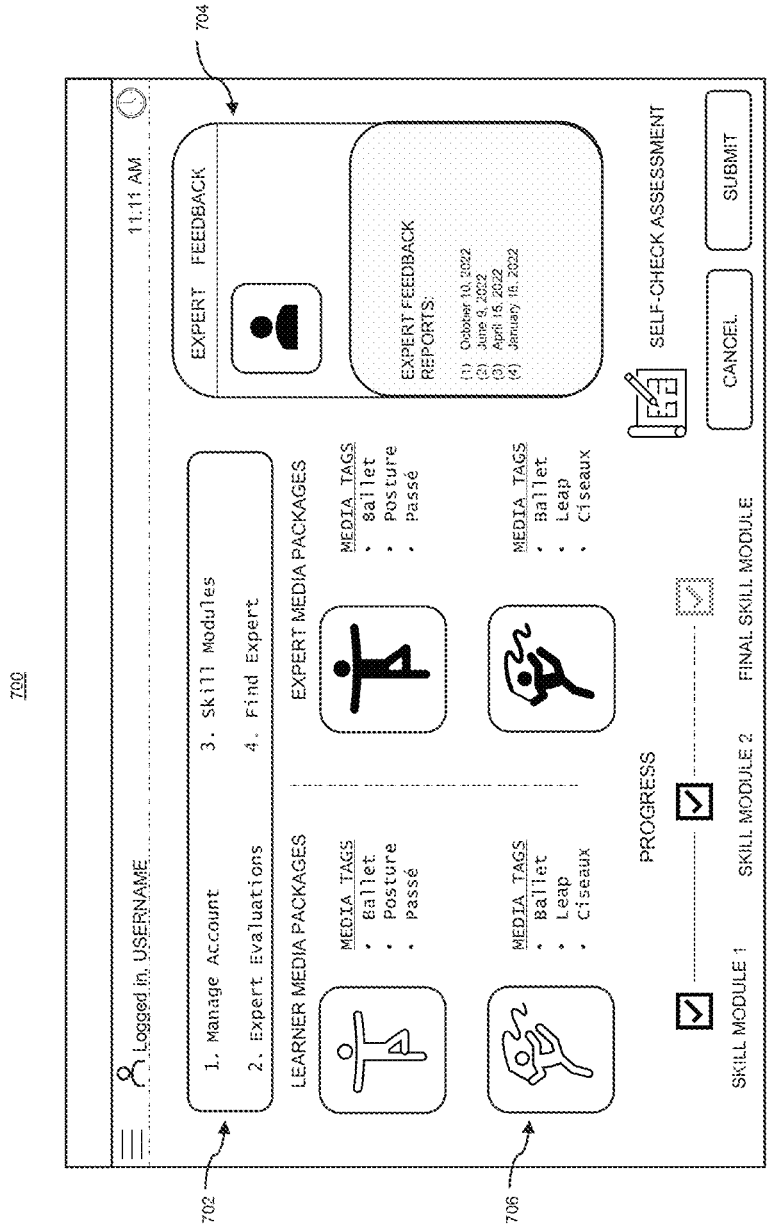
FIG. 7 illustrates an asynchronous video learning platform for providing asynchronous learning, according to various embodiments of the present disclosure.

Referring to FIG. 7, an interactive graphical user interface (GUI) 700 is depicted, according to various embodiments of the present disclosure. In some instances, the interactive GUI 700 may be a stand-alone application, or a sub-feature associated within a software product (e.g., a platform, dashboard and/or website), such as the previously discussed interactive asynchronous video learning platform. The interactive GUI 700 may be operated by one or more users using one or more user device(s) 102, administrator device(s) 104, and/or third-party device(s) 106. In some embodiments, interactive GUI 700 initiates and plays an integral role for providing an interface for interactive asynchronous video learning platform and for implementing one or more asynchronous learning methods as discussed with respect to FIGS. 1-6. As depicted in FIG. 7, interactive GUI 700 includes several dynamic features for providing asynchronous learning, providing interactive remote feedback, and providing a simultaneous interactive display of learner/expert demonstrations, self-checks, and feedback. In the illustrated example, interactive GUI 700 includes a user menu region 702, dynamic feedback region 704, and dynamic demonstration region 706, all of which may be made available to a learner via the learner's unique user profile. Notably, although interactive GUI 700 is discussed with respect to a learner, an expert and an administrator may have similar features available to them, but with different access, restrictions, and permissions.

As depicted in user menu region 702, a series of user options may be populated in response to the type of action being performed by a user. User menu region 702 may additionally be populated with various options based on inputs or changes to dynamic feedback region 704, and dynamic demonstration region 706. User menu region 702 may include options for managing a user account, requesting/responding/interacting with expert evaluations, navigating skill-based modules, finding experts, and the like. User menu region 702 may permit users to initiate a process for traversing a skill-based learning curriculum.

Dynamic feedback region 704 may enable a user to communicate with and access files stored in server system 108 or database(s) 110. In particular, dynamic feedback region 704 may enable a learner to receive feedback from an expert associated with the skill module the learner is currently assigned/subscribed to. In addition, dynamic feedback region 704 may enable a user to retrieve/view/communicatively respond to expert communication (e.g., feedback) and maintain a two-way dialogue (e.g., via video or text). Learners may additionally utilize dynamic feedback region 704 to tag an expert to initiate communication.

Dynamic demonstration region 706 may dynamically populate with media packages (including learner or expert skill demonstrations) submitted by learners and experts. In some instances, in dynamic demonstration region 706, the media packages may be displayed in temporal order. In some instances, one or more media packages may be displayed simultaneously. Here, dynamic demonstration region 706 may be responsive, such that media packages may be dynamically realigned and formatted to adjust to the input of a learner. Dynamic demonstration region 706 may automatically display relevant information associated with a learner's skill-based learning experience. For example, dynamic demonstration region 706 may automatically display media tags associated with submitted media packages. As depicted in FIG. 7, the media tags may include hyperlinked text/images/buttons that once selected may navigate a user (e.g., learner, expert, or administrator) to various regions or pages with information associated with the selected media tag. For example, if a learner selects a media tag associated with ballet, interactive GUI 700 may navigate a user to a page that displays skill-based modules, experts, and usernames of other learners, associated with ballet.

Dynamic demonstration region 706 may additionally be configured to depict information indicative of a learner's progress associated with a skill-based learning curriculum and further enable a user to initiate a self-check assessment.

Figure 8:
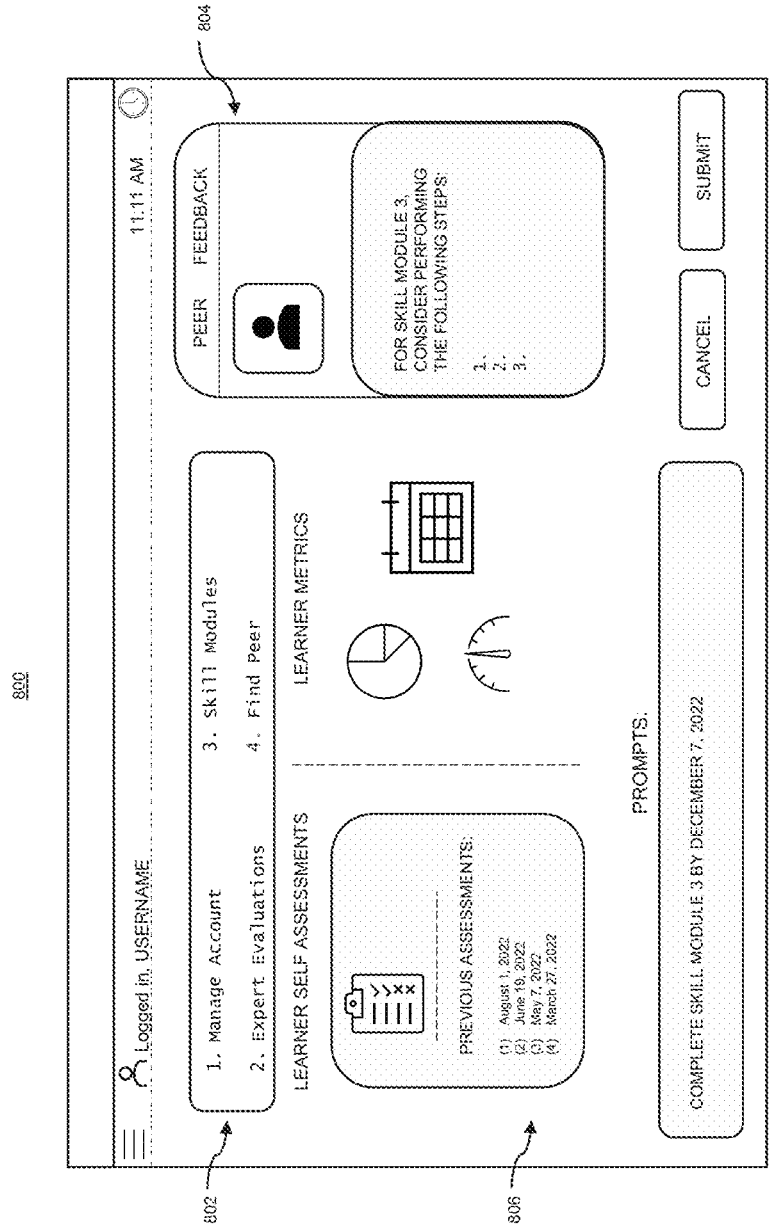
FIG. 8 illustrates an asynchronous video learning platform for providing asynchronous learning, according to various embodiments of the present disclosure.

Referring to FIG. 8, an interactive graphical user interface (GUI) 800 is depicted, according to various embodiments of the present disclosure. As discussed in relation to FIG. 7, interactive GUI 800 may be a stand-alone application, or a sub-feature associated within a software product (e.g., a platform, dashboard and/or website), such as the previously discussed interactive asynchronous video learning platform. Interactive GUI 800 may be an extension of interactive GUI 700, and include a user menu region 802, dynamic feedback region 804, and dynamic evaluation region 806, all of which may be made available to a learner via the learner's unique user profile. Notably, although interactive GUI 800 is discussed with respect to a learner, an expert and an administrator may have similar features available to them, but with different access, restrictions, and permissions.

As depicted in user menu region 802, a series of user options may be populated in response to the type of action being performed by a user. User menu region 802 may additionally be populated with various options based on inputs or changes to dynamic feedback region 804, and dynamic evaluation region 806. User menu region 802 may include options for managing a user account, requesting/responding/interacting with expert evaluations, navigating skill-based modules, finding peers (e.g., other learners), and the like. User menu region 802 may permit users to initiate a process for traversing a skill-based learning curriculum.

Dynamic feedback region 804 may enable a user to communicate with and access files stored in server system 108 or database(s) 110. In particular, dynamic feedback region 804 may enable a learner to receive feedback from a peer associated with the skill module the learner is currently assigned/subscribed to. In addition, dynamic feedback region 804 may enable a user to retrieve/view/communicatively respond to peer communication (e.g., feedback) and maintain a two-way dialogue (e.g., via video or text). Learners may additionally utilize dynamic feedback region 804 to tag a peer to initiate communication.

Dynamic evaluation region 806 may dynamically populate with learner self-assessments, learner metrics, learner prompts, and media packages (including learner or expert skill demonstrations) submitted by learners and experts. In some instances, dynamic evaluation region 806 may enable a learner to conduct a self-assessment (i.e., a self-check) of one or more previously submitted or current skill-demonstrations. Dynamic evaluation region 806 may receive instructions from self-check module 230. As such, dynamic evaluation region 806 may prompt a learner to engage in a self-check at predetermined time intervals.

Dynamic evaluation region 806 may additionally dynamically populate metrics associated with a learner. These metrics may include, but are not limited to, a learner's progress, frequency, or activity, and self-graded and expert provided feedback. Each individual metric may be selectable, and once selected, cause interactive GUI 800 to dynamically modify dynamic evaluation region 806 to display additional details regarding the selected metric. Notably, each metric may automatically be assigned tags and/or have data that is linked to database(s) 110, such that previously unknown insights regarding the learner's experience/performance may be intelligently uncoverable by server system 108 or by a user (e.g., a learner, expert, or administrator).

Dynamic evaluation region 806 may further provide a region for dynamically displaying prompts to a user (e.g., learner, expert, or administrator). As previously discussed, prompts may include, but are not limited to, demonstration of skills, advice regarding the learner's skills, and/or instructions that instruct the learner how to perform and submit their learner skill demonstration(s). Prompts may be presented in one or more media formats including, but not limited to, video, image, and written text formats. Prompts in audio format may include imagery with a voiceover, followed by a skill demonstration performed by the learner.

Figure 9:
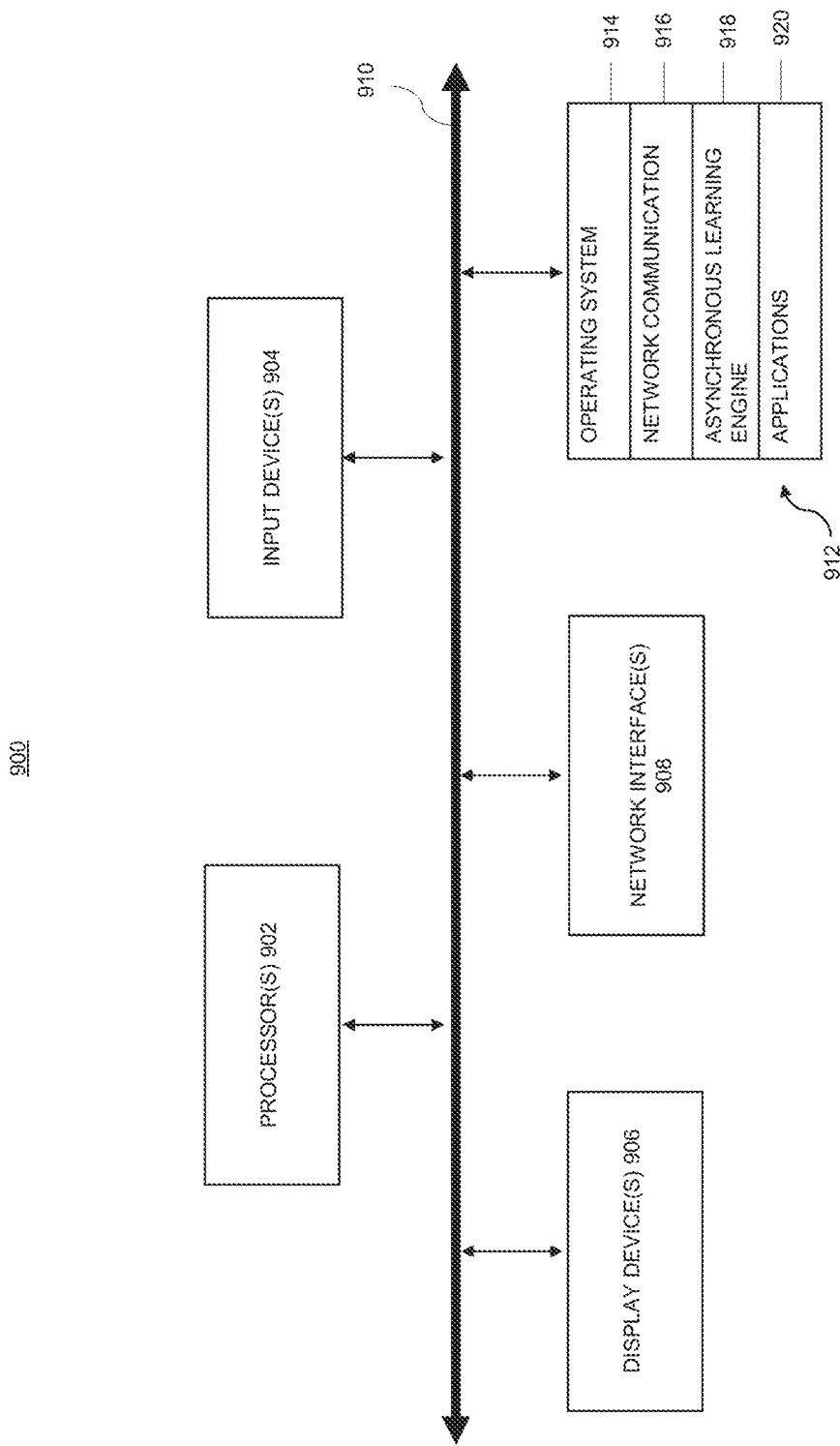
FIG. 9 illustrates a block diagram for a computing device, according to various embodiments of the present disclosure

Referring to FIG. 9, a block diagram for a computing device is depicted, according to various embodiments of the present disclosure. For example, computing device 900 may function as server system 108. The computing device 900 may be implemented on any electronic device that runs software applications derived from compiled instructions, including without limitation personal computers, servers, smart phones, media players, electronic tablets, game consoles, email devices, etc. In some implementations, the computing device 900 may include processor(s) 902, (one or more) input device(s) 904, one or more display device(s) 906, one or more network interfaces 908, and one or more computer-readable medium(s) 912 storing software instructions. Each of these components may be coupled by bus 910, and in some embodiments, these components may be distributed among multiple physical locations and coupled by a network 112.

Display device(s) 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device(s) 904 may be any known input device technology, including but not limited to a keyboard (including a virtual keyboard), mouse, track ball, camera, and touch-sensitive pad or display. Bus 910 may be any known internal or external bus technology, including but not limited to ISA, EISA, PCI, PCI Express, USB, Serial ATA, or FireWire. Computer-readable medium(s) 912 may be any non-transitory medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium(s) 912 may include various instructions for implementing an operating system 914 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 904; sending output to display device(s) 906; keeping track of files and directories on computer-readable medium(s) 912; controlling peripheral devices (e.g., disk drives, printers, etc.) which can be controlled directly or through an I/O controller; and managing traffic on bus 910. Network communications instructions 916 may establish and maintain network connections (e.g., software for implementing communication protocols, such as TCP/IP, HTTP, Ethernet, telephony, etc.).

Asynchronous learning engine 918 may include instructions that enable computing device 900 to implement one or more methods as described herein. Application(s) 920 may be an application that uses or implements the processes described herein and/or other processes. The processes may also be implemented in operating system 914. For example, application(s) 920 and/or operating system 914 may execute one or more operations to intelligently facilitate remote asynchronous skill-based learning via a media platform.

The described features may be implemented in one or more computer programs that may be executable on a programmable system including at least one programmable processor coupled to receive data and instructions from, and to transmit data and instructions to, a data storage system (e.g., database(s) 110), at least one input device, and at least one output device. A computer program is a set of instructions that can be used, directly or indirectly, in a computer to perform a certain activity or bring about a certain result. A computer program may be written in any form of programming language (e.g., Sandbox, SQL, Objective-C, C++, Java, JavaScript, Android, iOS), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system for providing an interactive asynchronous video learning platform, the system comprising:
   a storage device comprising one or more databases, wherein the one or more databases are configured to store:
   media packages originating from one or more user devices;
   user profiles associated with the one or more user devices; and
   relationships between the media packages, user profiles, and one or more metrics;
   at least one server configured to host an interactive asynchronous learning platform and implement instructions for:
   validating access permissions associate with one or more user devices;
   providing access to the interactive asynchronous learning platform to one or more validated user devices, wherein each of the one or more validated user devices has a corresponding unique user profile;
   receiving a selection of a least one skill module on each respective unique user profile corresponding to the one or more validated user devices;
   transmitting time-dependent prompts to the one or more validated user devices;
   receiving, on each respective unique user profile, one or more media packages in a first format from the one or more validated user devices in response to the time-dependent prompts, wherein the one or more media packages are associated with the at least one skill module;

converting the one or more media packages from the first format to a standardized asynchronous format;

maintaining the one or more media packages in the standardized asynchronous format and one or more expert media packages on each unique user profile, such that content of the one or more media packages and the one or more expert media packages can be simultaneously evaluated;

receiving, on each respective unique user profile, a self-evaluation package from the one or more validated user devices; and determining one or more metrics corresponding to each unique user profile based on its corresponding evaluation package.

2. The system of claim 1, further comprising wherein the time-dependent prompts correspond to time-related frequency parameters associated with the at least one skill module.

3. The system of claim 1, further comprising wherein the one or more media packages include data associated with a learner skill demonstration.

4. The system of claim 1, further comprising wherein converting the one or more media packages to a standardized asynchronous format includes, modifying metadata associated with the one or more media packages, modifying length of the one or more media packages, and modifying dimensions of the one or more media packages, and modifying dimensions of the one or more media packages.

5. The system of claim 1, further comprising wherein the one or more media packages and the one or more expert media packages are embedded in an interactive GUI such that side-by-side visual comparisons may be conducted by a user utilizing the interactive GUI.

6. The system of claim 1, further comprising an interactive GUI configured to transmit instructions to query a storage device, such that the self-evaluation package and one or more previous self-evaluation packages are simultaneously selectable via the interactive GUI.

7. The system of claim 1, further comprising wherein one or more metrics associated with learner frequency, learner self-assessment, and learner progress, are modified based on the self-evaluation package.

8. A computer-implemented method comprising:
validating access permissions associated with one or more user devices;

providing access to an interactive asynchronous learning platform to one or more validated user devices, wherein each of the one or more validated user devices has a corresponding unique user profile, receiving a selection of at least one skill module on each respective unique user profile corresponding to the one or more validated user devices;

transmitting time-dependent prompts to the one or more validated user devices;

receiving, on each respective unique user profile, one or more media packages in a first format from the one or more validated user devices in response to the time-dependent prompts, wherein the one or more media packages are associated with the at least one skill module;

converting the one or more media packages from the first format to a standardized asynchronous format;

maintaining the one or more media packages in the standardized asynchronous format and one or more expert media packages on each unique user profile, such that content of the one or more media packages and the one or more expert media packages can be simultaneously evaluated;

receiving, on each respective unique user profile, a self-evaluation package from the one or more validated user devices; and determining one or more metrics corresponding to each unique user profile based on its corresponding evaluation package.

9. The computer-implemented method of claim 8, further comprising wherein the time-dependent prompts correspond to time-related frequency parameters associated with the at least one skill module.

10. The computer-implemented method of claim 8, further comprising wherein the one or media packages include data associated with a leaner skill demonstration.

11. The computer-implemented method of claim 8, further comprising wherein converting the one or more media packages to a standardized asynchronous format includes modifying metadata associated with the one or more media packages, modifying length of the one or more media packages, and modifying dimensions of the one or more media packages.

12. The computer-implemented method of claim 8, further comprising wherein the one or more media packages and the one or more expert media packages are embedded in an interactive GUI such that side-by side visual comparisons may be conducted by a user utilizing the interactive GUI.

13. The computer-implemented method of claim 8, further comprising an interactive GUI configured to transmit instructions to query a storage device, such that the self-evaluation package and one or more previous self-evaluation packages are simultaneously selectable via the interactive GUI.

14. The computer-implemented method of claim 8, further comprising wherein one or more metrics associated with learner frequency, learner self-assessment, and learner progress, are modified based on the self-evaluation package.

* * * * *